United States Patent Office

3,751,569
Patented Aug. 7, 1973

3,751,569
CLEAR COOKING AND SALAD OILS HAVING HYPOCHOLESTEROLEMIC PROPERTIES
Billy Arthur Erickson, Springfield, Mo., assignor to The Procter & Gamble Company, Cincinnati, Ohio
No Drawing. Continuation-in-part of abandoned application Ser. No. 842,698, July 17, 1969. This application Jan. 12, 1972, Ser. No. 217,708
Int. Cl. A61k 15/02
U.S. Cl. 424—173    8 Claims

ABSTRACT OF THE DISCLOSURE

A cooking and salid oil composition having enhanced hypocholesterolemic properties is prepared by adding 0.5% to 10% (free sterol equivalent) by weight of the composition of plant sterol monocarboxylic acid ester to clear, liquid glyceride base oil.

CROSS REFERENCE

This application is a continuation-in-part of earlier filed, copending application Ser. No. 842,698, filed July 17, 1969 now abandoned.

BACKGROUND OF THE INVENTION

This invention relates to clear cooking and salad oils having dissolved therein a sufficient amount of plant sterol esters to give significant hypocholesterolemic [1] activity. These compositions remain clear at refrigerator temperatures, i.e. at 40° F. Moreover, sterol esters do not precipitate from the oil in the presence of water, for example, when a vinegar and oil emulsion is prepared. Thus, the esters are added to the oils in effective amounts without affecting the appearance of the oils.

The addition of hypocholesterolemic additives, including plant sterols and plant sterol esters to oils is old (see Wruble et al. U.S. 3,085,939; Jones U.S. 3,203,862; Beverage Canadian Patent 567,202; and Peterson et al. J. of Nutrition 50, 191–201 [1953]). However, plant sterols, that is free and unesterified sterols, must be added to oils in amounts usually less than about 0.5% by weight if the oils are to remain clear at refrigerator temperatures or if the added sterol is not to precipitate from the oil in the presence of water; the use of these very low amounts of added sterol do not provide significant hypocholesterolemic activity. The addition of plant sterol esters to oils in the amounts utilized in the invention to provide commercially acceptable clear oils, that is, dietary cooking and salad oils which remain clear even at refrigerator temperatures and which do not precipitate out additive in the presence of water and which provide significant hypocholesterolemic activity is deemed to be novel.

SUMMARY OF THE INVENTION

Briefly stated, the cooking and salad oil composition of this invention comprises a clear liquid glyceride base oil containing as an active hypocholesterolemic agent from 0.5% to 10% (free sterol equivalent) [2], by weight, and preferably from 1.5% to 3% (free sterol equivalent) by weight of the total composition, of added plant sterol monocarboxylic acid ester.

---

[1] As used herein, the term "hypocholesterolemic" means reducing the cholesterol level in the blood of warm-blooded animals or inhibiting or reducing the buildup of cholesterol in the blood.
[2] The percentages of plant sterol monocarboxylic acid ester herein are calculated as if an equivalent amount of free sterol were present. This is indicated by the use of the expression "(free sterol equivalent)" after the recited percentages.

DETAILED DESCRIPTION OF THE INVENTION

The added plant sterol monocarboxylic acid esters have their sterol moieties derived from any free (that is, unesterified) plant sterol. For example, the sterol moieties can be derived from free plant sterols [3] such as, for example; $\alpha$-sitosterol, O-sitosterol, stigmasterol, ergosterol, or campesterol. The sterol moieties can also be derived from mixtures of these free plant sterols such as soy sterols.

The monocarboxylic acid moieties of the plant sterol monocarboxylic acid esters can be any saturated monocarboxylic acid moiety containing from 1 to 12 carbon atoms (the solubility of longer chain saturated monocarboxylic acids is insufficient) or any unsaturated monocarboxylic acid moiety containing up to 24 carbon atoms.

The most preferred plant sterol monocarboxylic acid ester additives are $\beta$-sitosteryl acetate, $\beta$-sitosteryl oleate and stigmasteryl oleate.

Plant sterol monocarboxylic acid esters can be derived from free plants sterols by any convenient acylation method. For example, plant sterol monocarboxylic acid esters can be prepared by perchloric acid catalyzed esterification of the free sterols with monocarboxylic acid anhydrides. Free plant sterols are readily commercially available.

As previously indicated, the level of added plant sterol monocarboxylic acid ester should range from 0.5% to 10% (free sterol equivalent) by weight, and preferably from 1.5% to 3% (free sterol equivalent), by weight of the total cooking and salad oil composition. The level of added ester should be at least 0.5% to provide significant hypocholesterolemic activity. The maximum amount of added plant sterol esters that can be utilized is that amount which is soluble in the oil at refrigerator temperatures, that is at 40° F., i.e. an amount which is insufficient to come out of solution in the oil at refrigerator temperatures. A 10% upper limit has been chosen herein as a practical upper limit and because when used in amounts in excess of that limit most plant sterol esters come out of solution in oil at refrigerator temperatures. For example, an oil composition containing about 15% or more soy sterol caprate, as is disclosed in J. of Nutrition 50, 191–201 (1953), previously mentioned, is solid even at room temperature indicating insolubility of soy sterol caprate in oil in amounts greater than 10% (free sterol equivalent). Many of the plant sterol monocarboxylic acid ester additives of this invention are not soluble in oil compositions at refrigerator temperatures at levels less than the above 10% upper limit. The solubility level depends on the carbon chain length of the monocarboxylic acid moiety and its degree of unsaturation. For example, acetates of plant sterol esters are only oil-soluble to the extent of 4% to 5% at refrigerator temperatures while the corresponding oleates are oil soluble at refrigerator temperatures at levels greater than 10%. Most or all of the plant sterol monocarboxylic acid ester additives of this invention are soluble in oil at refrigerator temperatures at and below the maximum preferred limit of 3%.

In order to insure the clarity of the compositions of this invention, to the liquid glyceride base oil should preferably be substantially free of general purpose shortening emulsifiers such as mono- and diglyceride esters, lactylated glyceride esters, and any other materials which might tend to cloud the base oil or otherwise interfere with its clarity.

A wide variety of clear, liquid glyceride base oils can be used in the cooking and salad oil compositions of this

---

[3] As used herein, the term "plant sterol" includes all non-animal sterols, that is, not only phytosterols (plant sterols characteristic of higher plants) but also mycosterols (plant sterols from lower plants). For a more complete description of plant sterols see Deuel, Jr., Harry J., The Lipids Vol. I, Interscience Publishers (New York, 1951) at pages 321 and 348.

invention. Pure triglycerides liquid at refrigerator temperatures, such as triolein, are suitable. Also included among suitable oils are the so-called natural salad oils such as, for example, olive oil, sunflower seed oil, safflower oil, and sesame seed oil. Other naturally-occurring liquid glyceride oils such as, for example, cottonseed oil and corn oil are also useful; these oils are given a preliminary "winterizing," dewaxing, or similar treatment to remove the higher melting stearins before being used as a base oil. Certain other oils such as, for example, soybean oil, can be partially hydrogenated before use to improve their resistance to oxidative deterioration during prolonged storage periods; the higher melting solids formed during the hydrogenation treatment are preferably removed by winterization.

Suitable clear liquid glyceride base oils can also be obtained by directed, low temperature interesterification or rearrangement of animal or vegetable fatty materials, followed by the removal of the higher melting solids formed during the reaction. For an example of this procedure, see U.S. Pat. 2,442,532. Another group of oils suitable for use as the liquid glyceride base oil is that group of oils in which one or more short-chain fatty acids, such as acetic acid and propionic acid, replace in part, the long-chain fatty acids present in natural triglyceride oils.

Other useful clear liquid glyceride oils can be derived from animal, vegetable and marine sources, including mixtures of various such oils. Particularly preferred oils for use in this invention are triolein, cottonseed oil, soybean oil and mixtures thereof.

The cooking and salad oils herein can be conveniently prepared by dissolving liquid glyceride base oil and plant sterol monocarboxylic acid in a mutual solvent and then evaporating the solvent. Suitable mutual solvents are any of the usual fat solvents, such as hexane or diethyl ether.

The cooking and salad oil compositions herein reduce the level or cholesterol in the blood that is directly of dietary origin up to 50% compared to when no hypocholesterolemic additives are utilized. The compositions herein retain their efficacy even when utilized as an ingredient in other foods, for example in the production of bread.

The following examples further illustrate the novel cooking and salad oils of this invention, their hypocholesterolemic activity and the fact that they remain clear at refrigerator temperatures and do not precipitate out additive in the presence of water. All percentages in the examples are by weight.

EXAMPLE I

Plant sterol monocarboxylic esters were dissolved in dietary triolein to make up clear cooking and salad oil compositions. Radioactive cholesterol was also dissolved in the oil compositions. The oil compositions were prepared by dissolving the radioactive cholesterol, plant sterol monocarboxylic acid esters, and triolein in diethyl ether and then removing the diethyl ether by evaporation. The resulting oil compositions contained by weight 1% cholesterol and the weight percentage sterol ester indicated in the table below. The resulting oil was then emulsified with other dietary ingredients according to the following proportions:

| Ingredient: | Weight percent of total diet |
|---|---|
| Sucrose | 16.4 |
| Vitamins in sucrose | 3.6 |
| Nonfat milk solids | 18.2 |
| Salt | 1.8 |
| Water | 32.7 |
| Cooking and salad oil | 27.3 |
| | 100.0 |

Male rats (each weighing approximately 200 grams) that had been maintained on Purina Laboratory Chow were fasted overnight and a cannula was inserted into their thoracic duct. Before closing the incision 10 milliliters of 0.9 percent NaCl in water was placed in the abdominal cavity. After recovering from anaesthesia, the animals were given 5 grams of the above proportions of dietary ingredients except that the diet includes no salad and cooking oil ingredient. The rats were provided 0.9 weight percent NaCl in water for drinking.

On the following day about 5.5 milliliters of the above listed dietary ingredients (including the oil) was fed by stomach tube. Lymph was collected for 48 hours. Any animal whose lymph flow was less than 25 milliliters per 24 hours was discarded. The volume of lymph produced in 48 hours was determined. Duplicate samples of the diet and of the lymph were analyzed. The total amount of radioactivity in the lymph was used to determine the amount of dietary cholesterol that was absorbed. The reduction of dietary cholesterol in the lymph reflects reduction of dietary cholesterol in the blood.

The sterol ester contents of the dietary oil, the cholesterol absorption results, and the percentage reduction in cholesterol absorption compared to a control are given in the following Table I. In Table I, each result is an average result from the utilization of 10 rats.

TABLE I

| Plant sterol monocarboxylic acid ester | Level of added sterol ester in triolein composition (weight percentage as free sterol equivalent) | Dietary cholesterol absorbed (percentage) | Dietary cholesterol absorbed in control, i.e. with no plant sterol or plant sterol ester additive (percentage) | Percentage reduction in dietary cholesterol absorption compared to a control |
|---|---|---|---|---|
| β-Sitosteryl acetate [1] | 2.0 | 40.8 | 58.5 | 30 |
|  | 4.0 | 34.7 | 55.8 | 36 |
| β-Sitosteryl oleate [1] | 2.0 | 45.2 | 56.8 | 20.4 |
|  | 8.0 | 28.1 | 55.8 | 49 |
| Stigmasteryl oleate [2] | 2.0 | 45.6 | 56.8 | 19.8 |

[1] Acetate or oleate of plant sterol containing by weight 86.9% β-sitosterol, 8.9% campesterol, and the remainder impurity.
[2] Oleate of plant sterol containing by weight 87.6% stigmasterol, 7.6% β-sitosterol, 1.7% campesterol, and the remainder impurity.

Table I indicates that salad and cooking oils having triolein as a clear liquid glyceride base oil and containing the levels of plant sterol ester indicated reduce cholesterol absorption from about 20% to about 50% compared to when control oil is used containing no plant sterol ester additive.

Cooking and salad oil compositions having triolein as a clear liquid glyceride base oil and containing the amounts of the particular plant sterol monocarboxylic acid esters indicated in the above table are clear at room temperature, remain clear even at refrigerator temperatures, and the sterol ester in them does not precipitate from the oil in the presence of water.

Cholesterol absorption reduction results similar to those achieved above are achieved when refined and deodorized cottonseed oil or soybean oil hydrogenated to an iodine value of 107 is substituted for the triolein base oil above. These compositions are clear at room temperature, remain clear even at refrigerator temperatures, and the sterol ester in them does not precipitate from the oil in the presence of water.

EXAMPLE II

Various monocarboxylic esters were made with radioactive β-sitosterol and dissolved in triolein. Over a period of several days, the various solutions were tested several times to determine the level of radioactivity in the oil phase. The tests were carried out by first centrifuging the solutions and then placing a small sample of each solution in a liquid scintillation counter to determine its radioactivity. The amount of radioactivity in the oil phase is proportional to the amount of β-sitosterol in the oil phase, thus allowing determination of the solubility. This procedure was repeated until the solubility leveled off. The results are shown in Table II.

TABLE II

| Fatty acid ester: | Solubility (free sterol equivalent) |
|---|---|
| Acetate ($C_2$) | 4.6 |
| Hexanoate ($C_6$) | 5.3 |
| Decanoate ($C_{10}$) | 1.1 |
| Laurate ($C_{12}$) | 0.6 |
| Palmitate ($C_{16}$) | 0.1 |
| Oleate ($C_{18}$-unsaturated) | 7.9 |

Table II demonstrates that the applicant's claimed monocarboxylic acid moieties fall within the claimed solubility range.

What is claimed is:

1. A dietary oil composition having hypocholesterolemic activity, said composition consisting essentially of a clear liquid glyceride base oil containing an active hypocholesterolemic agent from 0.5% to 10% (free sterol equivalent), by weight of the total composition of added plant sterol monocarboxylic acid ester, the monocarboxylic acid moiety of said ester being selected from the group consisting of saturated monocarboxylic acid moieties containing from 1 to 12 carbon atoms and unsaturated monocarboxylic acid moieties containing up to 24 carbon atoms; said added ester being insufficient in amount to come out of solution in the base oil at refrigerator temperatures.

2. The dietary oil composition of claim 1 wherein the base oil contains from 1.5% to 3% (free sterol equivalent) by weight of the total composition of added plant sterol monocarboxylic acid ester.

3. The dietary oil composition of claim 2 wherein the plant sterol monocarboxylic acid ester has a plant sterol moiety derived from α-sitosterol, β-sitosterol, stigmasterol, ergosterol, campesterol or mixtures thereof.

4. The dietary oil composition of claim 3 wherein the base oil is selected from the group consisting of triolein, soybean oil, cottonseed oil and mixtures thereof.

5. The dietary oil composition of claim 4 wherein the added plant sterol monocarboxylic acid ester is β-sitosteryl acetate.

6. The dietary oil composition of claim 4 wherein the added plant sterol monocarboxylic acid ester is β-sitosteryl oleate.

7. The dietary oil composition of claim 4 wherein the added plant sterol monocarboxylic acid ester is stigmasteryl oleate.

8. A process for inhibiting and reducing the blood cholesterol level in warm-blooded animals which comprises ingesting in an effective amount upon oral administration the dietary oil of claim 1.

References Cited

UNITED STATES PATENTS

| 2,362,932 | 11/1944 | Rosenberg et al. | 260—397.2 |
| 2,693,476 | 11/1954 | Cummings et al. | 260—397.2 |
| 3,085,939 | 4/1963 | Wruble et al. | |
| 3,203,862 | 8/1965 | Jones. | |

FOREIGN PATENTS

| 567,202 | 11/1958 | Canada. |

OTHER REFERENCES

Chem. Abstracts 48: 12943F (1954) Peterson, D. W. et al., "Dietary Constituents Affecting Plasma and Liver Cholesterol in Cholesterol Fed Chicks."

Chem. Abstracts 48: 12943F (1954) Peterson, D. W. et al., "Effects of Dietary Sterols and Sterol Esters on Plasma and Liver Cholesterol in the Chick."

SHEP K. ROSE, Primary Examiner

U.S. Cl. X.R.

99—118, 163; 424—236

PO-1050
(5/69)

UNITED STATES PATENT OFFICE
CERTIFICATE OF CORRECTION

Patent No. 3,751,569          Dated August 7, 1973

Inventor(s) Billy Arthur Erickson

It is certified that error appears in the above-identified patent and that said Letters Patent are hereby corrected as shown below:

Col. 1, line 14      "salid" should be -- salad --

Col. 2, line 6      "O-sitosterol" should be -- β-sitosterol --

Col. 2, line 59      "to" should be deleted

Col. 3, line 37      "or" should be -- of --

Col. 6, line 18      "chloesterol" should be -- cholesterol --

Signed and sealed this 20th day of November 1973.

(SEAL)
Attest:

EDWARD M. FLETCHER, JR.
Attesting Officer

RENE D. TEGTMEYER
Acting Commissioner of Patents